United States Patent [19]

Ishimori et al.

[11] Patent Number: 4,977,760
[45] Date of Patent: Dec. 18, 1990

[54] SPEED CONTROL SYSTEM FOR A WORKING VEHICLE

[75] Inventors: Shoso Ishimori; Mikio Ishida, both of Sakai, Japan

[73] Assignee: Kubota, Ltd., Osaka, Japan

[21] Appl. No.: 281,716

[22] Filed: Dec. 9, 1988

[30] Foreign Application Priority Data

Dec. 15, 1987 [JP] Japan .................................. 62-316868
Jul. 20, 1988 [JP] Japan .................................. 63-180612
Jul. 20, 1988 [JP] Japan .................................. 63-95777[U]

[51] Int. Cl.$^5$ ....................... F16H 39/46; B60K 20/14
[52] U.S. Cl. ............................... 60/444; 60/487;
    91/216 A; 91/506; 92/117 A; 92/169.1
[58] Field of Search .................. 60/389, 392, 443, 444,
    60/487, 488; 91/216 R, 216 A, 505, 506;
    418/222; 92/117 R, 117 A, 161, 169.1

[56] References Cited

U.S. PATENT DOCUMENTS

| 3,107,490 | 10/1963 | Cooper et al. | 60/443 |
| 3,127,745 | 4/1964 | Young | 60/444 X |
| 3,158,068 | 11/1964 | Bokelman | 91/216 A X |
| 3,188,810 | 6/1965 | Kuze | 60/444 |
| 3,412,553 | 11/1968 | Wright | 60/443 |
| 3,555,817 | 1/1971 | Hann | 60/444 |
| 3,669,569 | 6/1972 | Wagenseil | 417/222 |
| 3,772,888 | 11/1973 | Orlando | 60/444 |
| 3,823,792 | 7/1974 | Dinkloh et al. | 60/488 X |

FOREIGN PATENT DOCUMENTS

| 402530 | 2/1966 | Australia | 60/487 |
| 852538 | 9/1970 | Canada | 60/444 |
| 1108236 | 8/1984 | U.S.S.R. | 417/222 |
| 1204782 | 1/1986 | U.S.S.R. | 417/222 |
| 1232845 | 5/1986 | U.S.S.R. | 417/222 |
| 1423780 | 9/1988 | U.S.S.R. | 417/222 |
| 1258422 | 12/1971 | United Kingdom | 60/487 |

Primary Examiner—Edward K. Look
Assistant Examiner—George Kapsalas
Attorney, Agent, or Firm—Edwin E. Greigg

[57] ABSTRACT

A speed control system for a working vehicle comprises a hydrostatic transmission for propelling the vehicle, a hydraulic cylinder and a control valve. The hydraulic cylinder includes a cylinder case operatively connected to a control shaft for varying a swash plate angle of the hydrostatic transmission, and a piston rod fixed to a case containing the hydrostatic transmission. The control valve is fixed to the cylinder case and includes a spool extending parallel to the hydraulic cylinder and operatively connected to a foot pedal for manually controlling the hydrostatic transmission. The cylinder case is shiftable following a shift of the valve spool.

13 Claims, 7 Drawing Sheets

Fig. 6
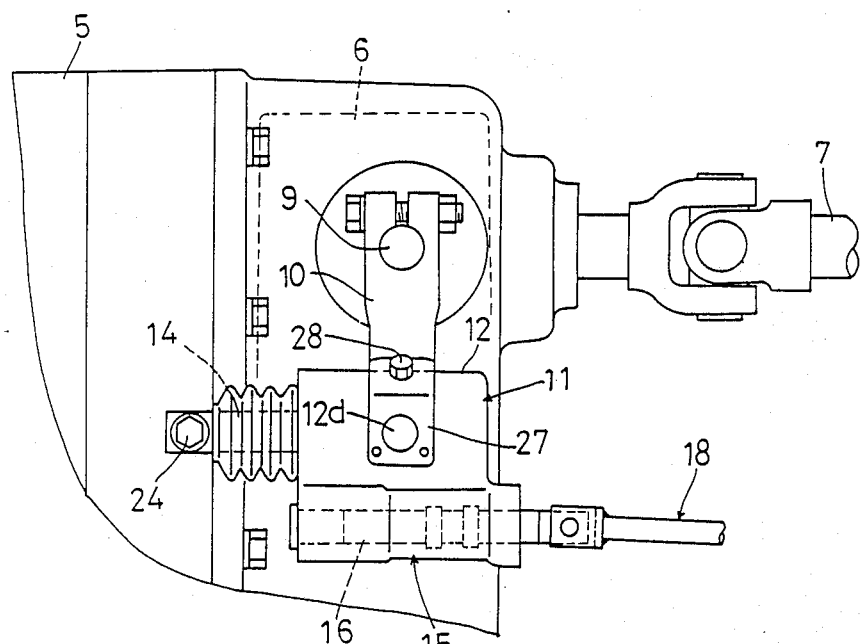
Fig. 7
Fig. 8
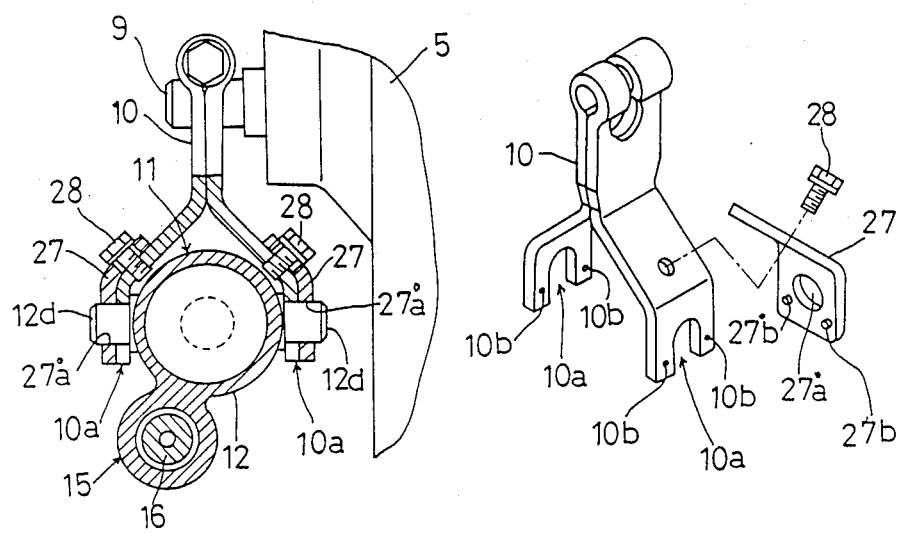

SPEED CONTROL SYSTEM FOR A WORKING VEHICLE

BACKGROUND OF THE INVENTION

1. Field of the Invention

The present invention relates to a speed control system for a working vehicle equipped with a hydrostatic transmission for propelling the vehicle.

2. Description of the Prior Art

There are many types of working vehicles equipped with a hydrostatic transmission, in which a control shaft for varying a swash plate angle of the hydrostatic transmission is directly and mechanically connected to a change speed pedal through a rod or the like. The swash plate of the hydrostatic transmission receives a reaction force of oil delivery from a hydraulic pump for returning the hydrostatic transmission to a neutral position. The change speed pedal must be operated against this force, which requires a relatively strong pedal operating force. Meanwhile, a working vehicle has been proposed in which a control position of the change speed pedal is electrically detected with a potentiometer or the like, and the swash plate angle of the hydrostatic transmission is controlled by means of a motor in response to the detected control position.

A working vehicle such as an agricultural tractor engages in an operation while running on an unpaved road, on a soft field, or in other unfavorable conditions. Thus, mud, soil, water and the like tend to adhere to lower positions of the tractor. Under such conditions, the electric linkage as noted above is not expected to assure a high degree of reliability and durability, but rather likely to cause a malfunction.

SUMMARY OF THE INVENTION

The present invention has been made having regard to the state of the art noted above, and its object is to provide a reliable and durable speed control system which allows the swash plate of the hydrostatic transmission to be controlled with ease.

In order to achieve this object, a speed control system for a working vehicle according to the present invention comprises a hydrostatic transmission for propelling the vehicle, manual control means for manually controlling the hydrostatic transmission, a hydraulic cylinder including a cylinder case operatively connected to a control shaft for varying a swash plate angle of the hydrostatic transmission, and a piston rod fixed to a case containing the hydrostatic transmission, and a control valve fixed to the cylinder case and including a spool operatively connected to the manual control means, the cylinder case being shiftable in a feedback mode following a shift of the spool.

In the above construction, when the manual control means is operated to move the spool of the control valve, the hydraulic cylinder receives and exhausts pressure oil and the cylinder case follows in the direction of movement of the spool. As a result, the control shaft is operated to control the swash plate angle of the hydrostatic transmission. Thus, it acts as a so-called servomechanism.

The control valve is fixed to the hydraulic cylinder to form one unit together. Accordingly, the hydraulic cylinder and control valve are readily detachable from the hydrostatic transmission by disconnecting the cylinder case from the swash plate control shaft, disconnecting the piston rod from the case containing the hydrostatic transmission, disconnecting the spool of the control valve from the manual control means, and disconnecting pipings from the control valve. A linkage extending from the manual control means to the control valve and hydraulic cylinder may readily be connected to the swash plate control shaft or control arm.

The hydraulic linkage interconnecting the manual control means such as a foot pedal and the control shaft of the hydrostatic transmission provides improved reliability and durability over the known electric linkage. Further, the hydraulic cylinder and control valve forming a unit are readily attachable and detachable, which facilitates handling as well as model changes.

It is possible to connect the linkage extending from the manual control means, which itself may be regarded as a known structure, to the cylinder case or to the swash plate control shaft (or its control arm). This feature facilitates a change from the type in which the manual control means and the control shaft of the hydrostatic transmission are directly interconnected to the type in which the hydraulic cylinder is included in the system.

Where the speed control system includes the hydraulic mechanism for varying the swash plate angle of the hydrostatic transmission, a pump must be provided to supply pressure oil to the hydraulic mechanism. A pump provided specially for the hydraulic mechanism would raise the manufacturing cost.

The present invention contemplates a subject matter for providing the hydraulic mechanism for varying the swash plate angle of the hydrostatic transmission, without a substantial increase in the manufacturing cost and a power loss.

To achieve this subject matter, the present invention may be embodied such that the control valve includes an oil inlet port connected to an intermediate position of a charge oil line extending from a charge pump to the hydrostatic transmission.

Since the amount of pressure oil in the hydrostatic transmission becomes reduced, a charge pump is provided specially for replenishing the hydrostatic transmission with the pressure oil when necessary. The pressure oil does not leak from the hydrostatic transmission rapidly or frequently, and a large part of pressure oil supplied from the charge pump in constant rotation is returned to a tank through a relief valve.

The pressure oil returned from the charge pump to the tank may be supplied to the hydraulic mechanism as in the present invention. This does not result in any trouble in the oil replenishment for the hydrostatic transmission, and eliminates the necessity to provide an additional pump specially for the hydraulic mechanism.

Thus, the present invention makes effective use of operation of the known charge pump associated with the hydrostatic transmission. This feature allows the hydraulic mechanism for varying the swash plate angle to be provided without a special pump acting as a hydraulic pressure source, thereby avoiding a substantial cost increase and a power loss.

Other features and advantages of the present invention will be apparent from the following description of the embodiments.

BRIEF DESCRIPTION OF THE DRAWINGS

The drawings show a speed control system for a working vehicle according to the present invention, in which:

FIG. 6 is a side view of a modified hydraulic cylinder connected to a control arm, FIG. 7 is a front view in vertical section of the modified hydraulic cylinder connected to the control arm, FIG. 8 is an exploded perspective view of the control arm and a mounting plate.

DESCRIPTION OF THE PREFERRED EMBODIMENTS

A speed control system for an agricultural tractor embodying the present invention will be described hereinafter with reference to the drawings.

Figure 1:
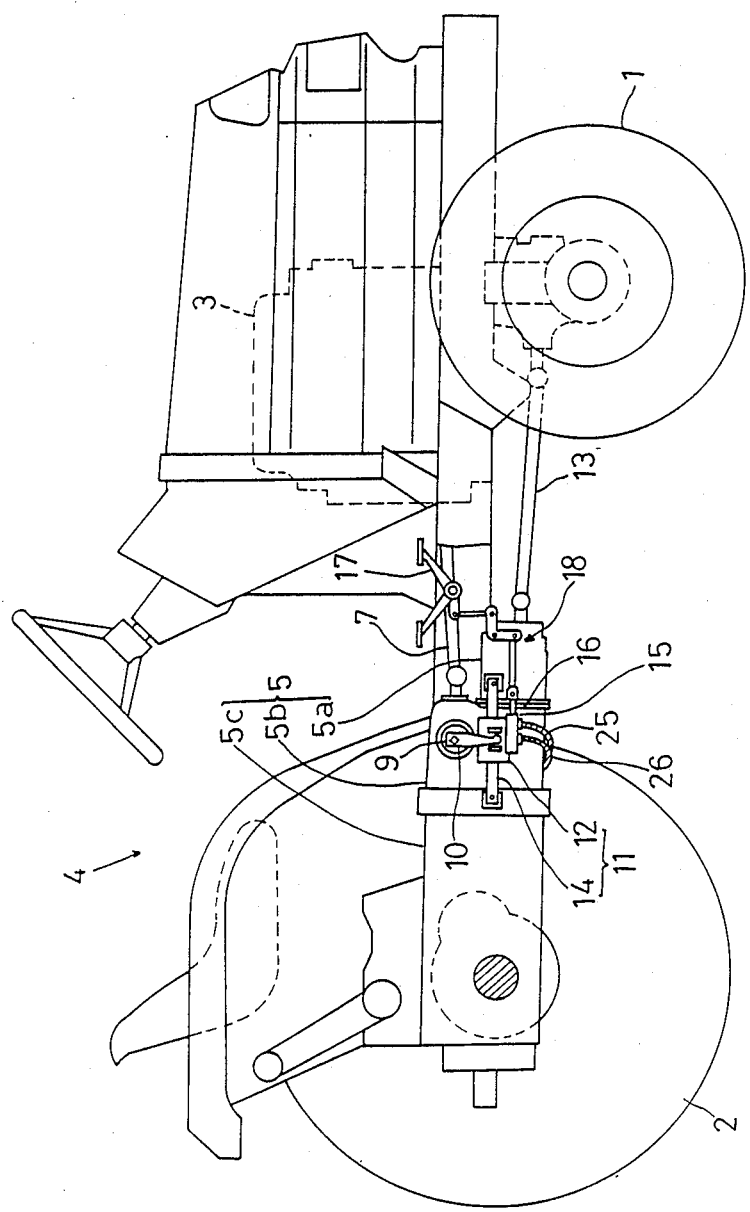
FIG. 1 is a side elevation of an agricultural tractor.

FIG. 1 shows a four wheel drive agricultural tractor having front wheels 1, rear wheels 2, an engine 3 mounted on a front position of a tractor frame, a driver's section 4 disposed centrally of the frame, and a transmission case 5 disposed at a rear position.

Figure 2:
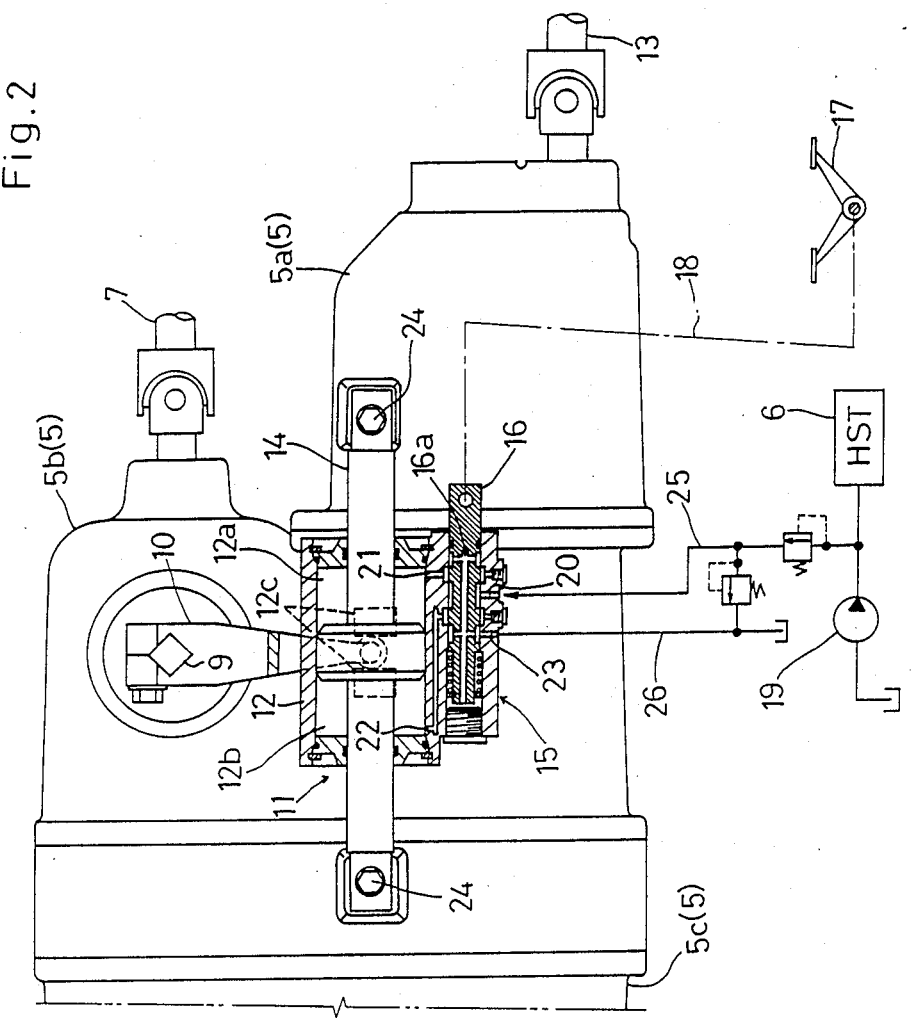
FIG. 2 is a sectional view of a hydraulic cylinder and a control valve in a neutral position.

Referring to FIGS. 1 and 2, the transmission case 5 comprises a front case 5a housing a front wheel change speed mechanism (not shown), an intermediate case 5b housing a hydrostatic transmission 6, and a rear case 5c housing an auxiliary change speed gear mechanism (not shown) and a differential (not shown). The three cases 5a, 5b and 5c are interconnected to constitute the transmission case 5.

The power of engine 3 is transmitted through a first transmission shaft 7 to the hydrostatic transmission 6 housed in the intermediate case 5b. The hydrostatic transmission 6 transmits the power through the auxiliary change speed mechanism to the rear wheels 2. Power branched off at the auxiliary change speed mechanism is transmitted to the front wheel change speed mechanism in the front case 5a and then through a second transmission shaft 13 to the front wheels 1.

Figure 4:
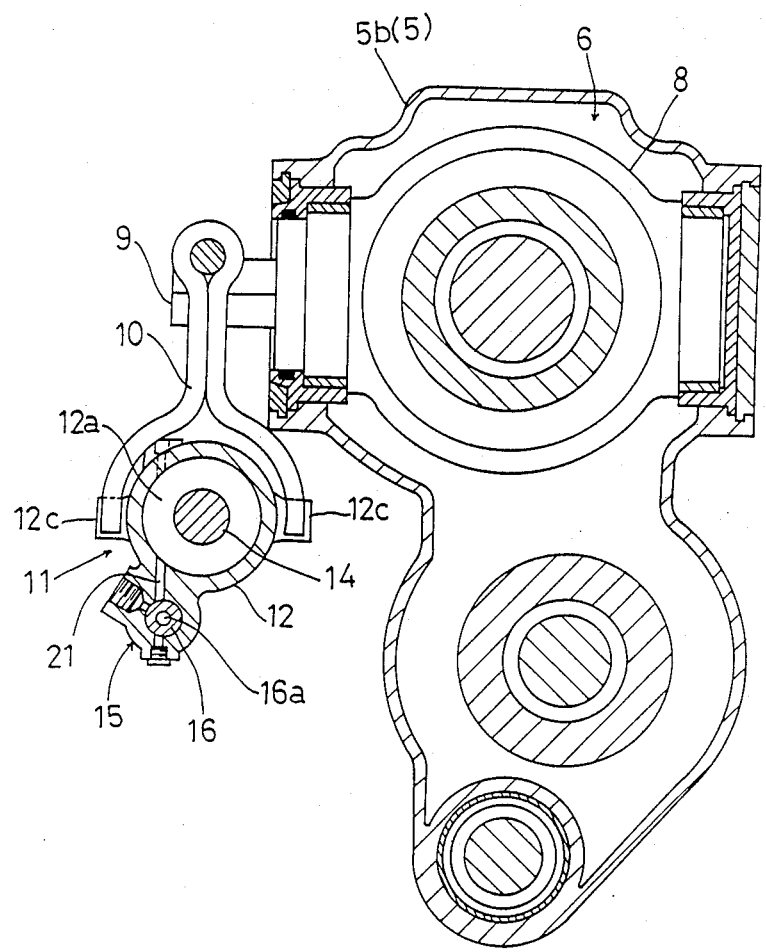
FIG. 4 is a front view in vertical section of a portion of a hydrostatic transmission including a swash plate.

A control system for controlling the hydrostatic transmission 6 will be described with reference to FIGS. 2 and 4. The hydrostatic transmission 6 has a swash plate 8 from which a control shaft 9 projects laterally. The control shaft 9 carries a bifurcate control arm 10 comprising a bent plate. The control arm 10 is connected to a hydraulic cylinder 11. The hydraulic cylinder 11 comprises a cylinder case 12 and a piston rod 14, the cylinder case 12 defining a first oil chamber 12a and a second oil chamber 12b. The piston rod 14 is connected at opposite ends thereof to lateral walls of the front case 5a and the intermediate case 5b by bolts 24. The cylinder case 12 has two projections 12c on each of its inner and outer lateral walls, and the control arm 10 has distal ends thereof received between the projections 12c, respectively.

A spool type control valve 15 is formed below and integrally with the cylinder case 12, with a spool 16 extending parallel to the piston rod 14. The spool 16 is mechanically and operatively connected through a linkage 18 to a change speed pedal acting as a manual control device 17.

Operations of the change speed pedal 17, control valve 15 and hydraulic cylinder 11 will be described next. As shown in FIG. 2, the control valve 15 receives pressure oil at a pump port 20 thereof, which pressure oil is supplied by a charge pump 19 acting to replenish the hydrostatic transmission 6 with pressure oil.

Figure 5:
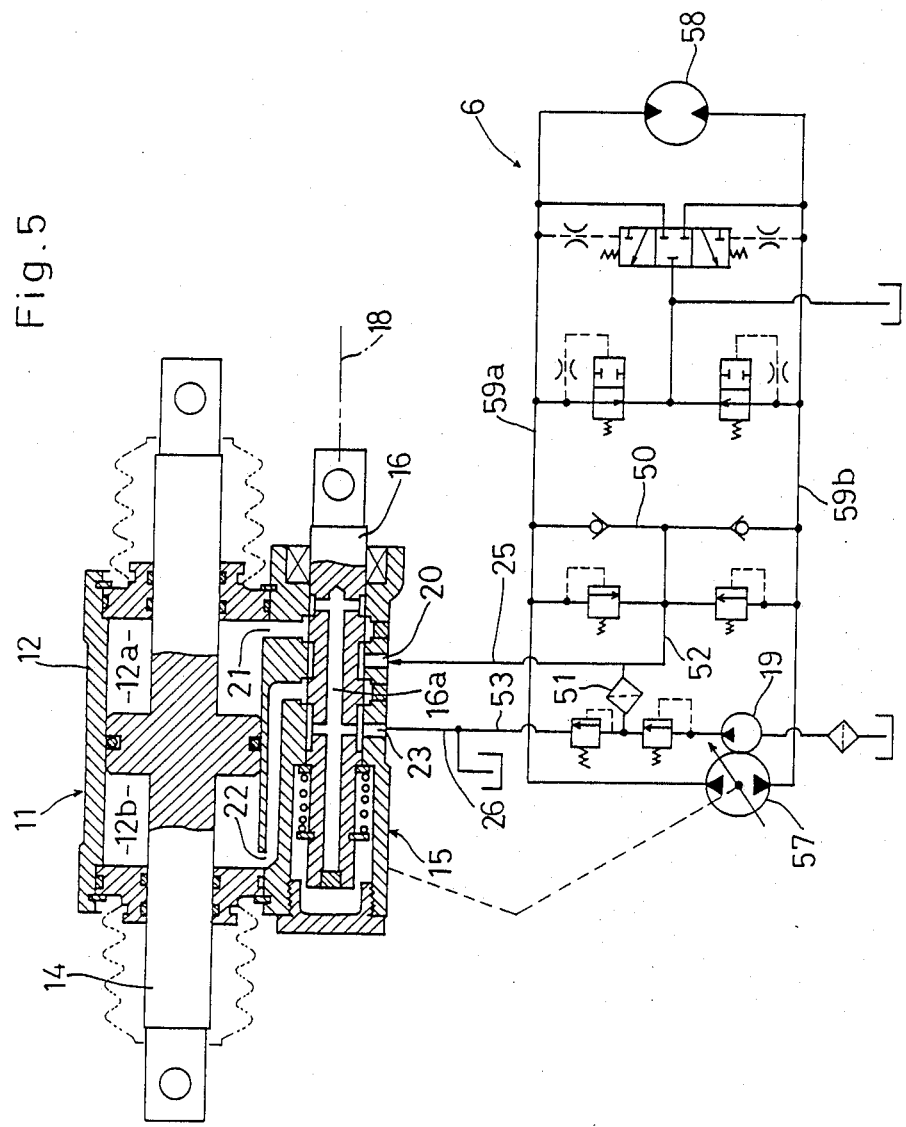
FIG. 5 is a view showing a hydraulic circuit associated with the hydrostatic transmission.

As shown in FIG. 5, a hydraulic circuit for this purpose has a closed loop structure including a hydraulic pump 57 and a hydraulic motor 58 driven by the engine 3 and connected to each other through a pair of oil lines 59a and 59b. A charge oil line 50 extends between the two oil lines 59a and 59b. An oil line 52 having a filter 51 is connected between the charge oil line 50 and the charge pump 19 which is constantly driven by the engine 3. An oil line 25 branches from the oil line 52 at a position downstream of the filter 51, and extends to the pump port 25 of the control valve 15. The control valve 15 has a drain port 23 connected to an oil line 26 which is connected to a relief oil line 53 extending from the charge pump 19.

Figure 3:
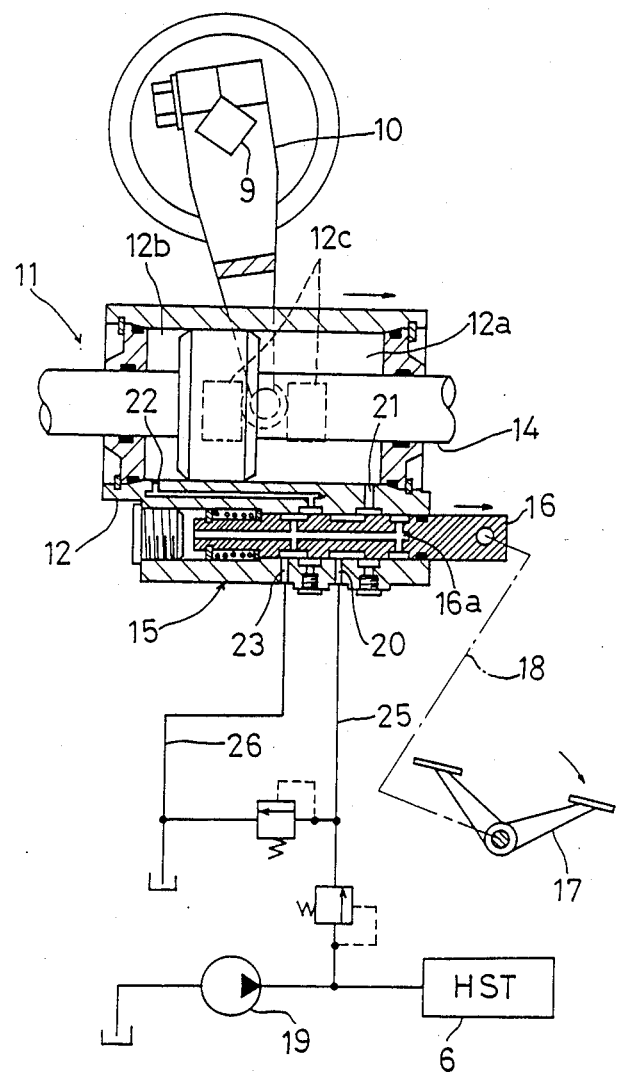
FIG. 3 is a sectional view of the hydraulic cylinder and control valve with a change speed pedal depressed forward.

FIG. 2 shows the hydraulic cylinder 11 and control valve 15 in a neutral position. When the change speed pedal 17 is depressed forward, the pedal 17 pulls the spool 16 of control valve 15 forward through the linkage 18 as shown in FIG. 3. In this position, the pump port 20 is placed in communication with a first port 21 whereby the pressure oil is supplied into the first oil chamber 12a of the cylinder case 12. At the same time, pressure oil in the second oil chamber 12b is exhausted through a second port 22 and the drain port 23. The cylinder case 12 and control valve 15 thus move rightward in FIG. 3, which results in the control shaft 9 and swash plate 8 moving toward a position for forward acceleration.

Conversely, when the change speed pedal 17 is depressed backward, the spool 16 of control valve 15 is pushed in, whereupon the pump port 20 is placed in communication with the second port 22. Consequently, the pressure oil is supplied into the second oil chamber 12b of the cylinder case 12, and the pressure oil in the first oil chamber 12a is exhausted through the first port 21, an oil passage 16a defined in the spool 16 and through the drain port 23. The cylinder case 12 and control valve 15 thus move leftward in FIG. 2, which results in the control shaft 9 and swash plate 8 moving toward a position for backward acceleration.

According to the above construction, the hydraulic cylinder 11 and control valve 15 are detachable by removing the bolts 24 which connect the piston rod 14 of the hydraulic cylinder 11 to the front case 5a and the intermediate case 5b, disconnecting the spool 16 of the control valve 15 from the linkage 18, and disconnecting pipings 25 and 26 from the pump port 20 and drain port 23 of the control valve 15.

FIGS. 6 through 8 show another embodiment of the present invention, which comprises a piston rod 14 fixed at one position thereof to the transmission case 5, and in which a transmission control shaft 9 and a cylinder case 12 are interconnected in a different way to the foregoing embodiment.

Referring to FIGS. 6 through 8, this embodiment includes a control arm 10 connected to a hydraulic cylinder 11 as in the foregoing embodiment. The hydraulic cylinder 11 has a piston rod 14 extending only rearwardly from the cylinder case 12, with an extreme end of the piston rod 14 connected to a lateral wall of the transmission case 5 by a bolt 24. The connection between the control arm 10 and the hydraulic cylinder 11 comprises right and left pins 12d projecting from the cylinder case 12, and recesses 10a defined at lower ends of the control arm 10. Each pin 12d is placed in each recess 10a from below. This connection further comprises bent connecting plates 27, each of which defines a bore 27a and position setting projections 27b on an inside wall thereof. Each connecting plate 27 is placed in contact with the control arm 10, with the pin 12 inserted into the bore 27a and the projections 27b moved into position setting holes 10b defined in the control arm 10. Then the connecting plate 27 is fixed in position by a bolt 28. The position setting projections 27b are formed by punching the connecting plate 27 at appropriate outside positions thereby to cause opposite inside positions to project.

The construction of this embodiment provides an interlocking between the control arm 10 and the cylinder case 12 with greater assurance.

Figure 9:
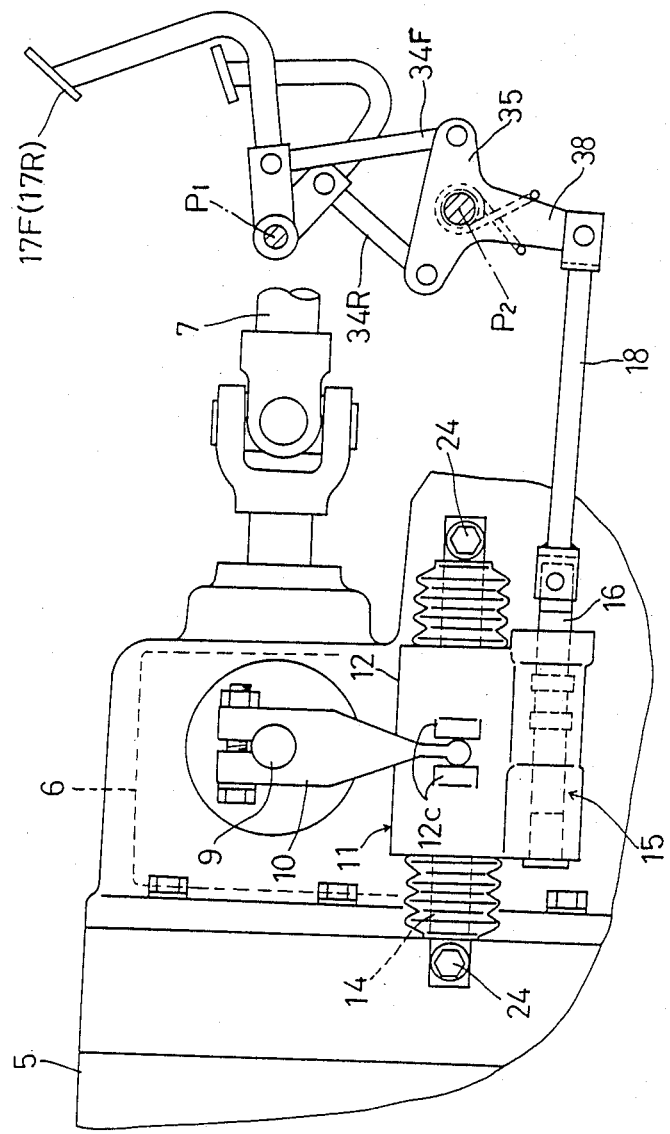
FIG. 9 is a side view showing a modified manual control device.

FIG. 9 shows a modified manual control device 17 which comprises two foot pedals arranged side by side and operable independently of each other, as distinct from the change speed pedal 17 shown in FIGS. 2 and 3 which is selectively depressed forward and backward.

As seen, the manual control device 17 comprises a forward pedal 17F and a backward pedal 17R supported to be pivotable independently of each other on a transverse axis P1 at a lower position of the driver's section 4. A T-shaped control arm 38 is supported pivotable on a further transverse axis P2 below the axis P1. The two pedals 17F and 17R are connected to the control arm 38 through interlocking rods 34F and 34R, respectively. The control arm 38 is connected to the spool 16 of control valve 15 through an interlocking rod 18, and is urged to neutral by a helical spring 35. The manual control device 17 may have such a construction.

We claim:

1. A speed control system for a working vehicle comprising:
    a hydrostatic transmission (6) for propelling the vehicle, said hydrostatic transmission including a control shaft (9) for varying a swash angle,
    a control arm (10) extending from said control shaft and defining a fork portion in a free end thereof,
    manual control means (17) for manually controlling said hydrostatic transmission (6),
    a hydraulic cylinder (11) including a cylinder case (12) operatively connected to said control shaft (9) for varying the swash plate angle of said hydrostatic transmission (6),
    engaging means (12c) in an outer lateral wall of said cylinder case (12) for engaging said fork portion of the control arm and transmitting movement of the cylinder case to said control arm,
    a piston rod (14) fixed to a case (5) containing said hydrostatic transmission (6), and
    a control valve (15) fixed to said cylinder case (12) and including a spool (16) operatively connected to said manual control means (17), said cylinder case (12) being shiftable following a shift of said spool (16).

2. A speed control system as claimed in claim 1, wherein said control valve (15) includes an oil inlet port (20) connected to an intermediate position of a charge oil line (50) extending from a charge pump (19) to said hydrostatic transmission (6).

3. A speed control system as claimed in claim 1, wherein said spool (15) extends parallel to said hydraulic cylinder (11).

4. A speed control system as claimed in claim 1, wherein said hydraulic cylinder (11) and said control valve (15) are integral with each other.

5. A speed control system as claimed in claim 1, wherein said piston rod (14) extends from opposite ends of said cylinder case (12), with opposite ends of said piston rod (14) fixed to said case (5) containing said hydrostatic transmission (6).

6. A speed control system as claimed in claim 1, wherein said piston rod (14) extends only rearwardly from said cylinder case (12), with an extreme end of said piston rod (14) fixed to said case (5) containing said hydrostatic transmission (6).

7. A speed control system as claimed in claim 1, wherein said manual control means (17) includes a foot pedal which is selectively pivotable forward and backward.

8. A speed control system as claimed in claim 1, wherein said manual control means (17) includes a plurality of foot pedals arranged side by side and operable independently of each other.

9. A speed control system as claimed in claim 1, wherein said hydrostatic transmission (6) is housed in an intermediate transmission case (5b) disposed between a front transmission case (5a) housing a front wheel change speed mechanism and a rear transmission case (5c) housing an auxiliary change speed gear mechanism and a differential, said hydrostatic transmission (6) receiving power of an engine (3) mounted at a front position of a vehicle frame and transmitting the power to said auxiliary change speed gear mechanism from which the power is transmitted to front wheels (1) and rear wheels (2).

10. A speed control system as claimed in claim 1, wherein said engaging means comprises projections (12c) projecting outwardly of opposite sides of said cylinder case (12) and engaging said fork portion of said control arm.

11. A speed control system as claimed in claim 1, wherein said engaging means comprises pins (12d) projecting outwardly of opposite sides of said cylinder case (12), and connecting plates (27) defining bores for receiving said pins, respectively, said connecting plates being clamped to said fork portion of the control arm.

12. A speed control system for a working vehicle comprising:
    a hydrostatic transmission (6) for propelling the vehicle,
    manual control means (17) for manually controlling said hydrostatic transmission (6),
    a hydraulic cylinder (11) including a cylinder case (12) operatively interconnected through a pair of pins (12d) projecting from an inward wall and an outward wall of said cylinder case (12) to a control shaft (9) for varying a swash plate angle of said hydrostatic transmission (6),
    a bifurcate control arm (10) extending from said control shaft (9) and having distal ends thereof each received between said projections (12c),
    a piston rod (14) fixed to a case (5) containing said hydrostatic transmission (6), and
    a control valve (15) fixed to said cylinder case (12) and including a spool (16) operatively connected to said manual control means (17), said cylinder case (12) being shiftable following a shift of said spool (16).

13. A speed control system for a working vehicle comprising:

a hydrostatic transmission (6) for propelling the vehicle, manual control means (17) for manually controlling said hydrostatic transmission (6), a hydraulic cylinder (11) including a cylinder case (12) operatively interconnected through a pair of pins (12d) projecting from an inward wall and an outward wall of said cylinder case (12) to a control shaft (9) for varying a swash plate angle of said hydrostatic transmission (6), a bifurcate control arm (10) extending from said control shaft (9) and engaged with said pins (12d), a pair of connecting plates (27) for connecting said pins (12d) and said control arm (10), a piston rod (14) fixed to a case (5) containing said hydrostatic transmission (6), and a control valve (15) fixed to said cylinder case (12) and including a spool (16) operatively connected to said manual control means (17), said cylinder case (12) being shiftable following a shift of said spool (16).

* * * * *